United States Patent
Liu et al.

(10) Patent No.: US 7,415,262 B2
(45) Date of Patent: Aug. 19, 2008

(54) WIRELESS ACCESS POINT POWER CONTROL

(75) Inventors: Jiewen Liu, San Diego, CA (US); Chih C. Tsien, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 617 days.

(21) Appl. No.: 10/812,199

(22) Filed: Mar. 29, 2004

(65) Prior Publication Data

US 2005/0213532 A1 Sep. 29, 2005

(51) Int. Cl.
*H04Q 7/20* (2006.01)
(52) U.S. Cl. .............. 455/318; 455/321; 455/332; 455/333
(58) Field of Classification Search .......... 370/245, 370/256, 258, 310.2, 328, 338, 331, 332, 370/333, 329, 342, 318; 455/403, 422.1, 455/450, 454, 426.1, 507, 517, 518, 519, 455/69, 522, 67.11
See application file for complete search history.

(56) References Cited

U.S. PATENT DOCUMENTS

| | | | | |
|---|---|---|---|---|
| 6,898,437 | B1 * | 5/2005 | Larsen et al. | 455/522 |
| 6,947,768 | B2 * | 9/2005 | Adachi et al. | 455/560 |
| 6,978,151 | B2 * | 12/2005 | Choi et al. | 455/522 |
| 7,215,973 | B2 * | 5/2007 | Backes et al. | 455/522 |
| 2003/0045317 | A1 * | 3/2003 | Pan et al. | 455/518 |
| 2004/0005907 | A1 * | 1/2004 | Tain et al. | 455/522 |
| 2004/0223479 | A1 * | 11/2004 | Vallstrom et al. | 370/338 |
| 2004/0229563 | A1 * | 11/2004 | Fitton et al. | 455/7 |
| 2005/0128970 | A1 * | 6/2005 | Tsien et al. | 370/315 |

* cited by examiner

*Primary Examiner*—Jean A Gelin
(74) *Attorney, Agent, or Firm*—Dana B. Lemoine; Lemoine Patent Services. PLLC

(57) ABSTRACT

An access point in a wireless network receives link margin values from associated access points. The access point determines sensitivity values for the associated access points and determines a lower access point output power value from the sensitivity values. Beacons are transmitted at full power and remaining frames are transmitted at the lower access output power. A new access output power may be determined periodically, or when a station associates or disassociates.

17 Claims, 4 Drawing Sheets

WIRELESS ACCESS POINT POWER CONTROL

FIELD

The present invention relates generally to computer networks, and more specifically to wireless local area networks.

BACKGROUND

Wireless local area networks may include any number of access points and mobile stations. When access points are placed in proximity with one another, interference may result.

DESCRIPTION OF EMBODIMENTS

Figure 1:
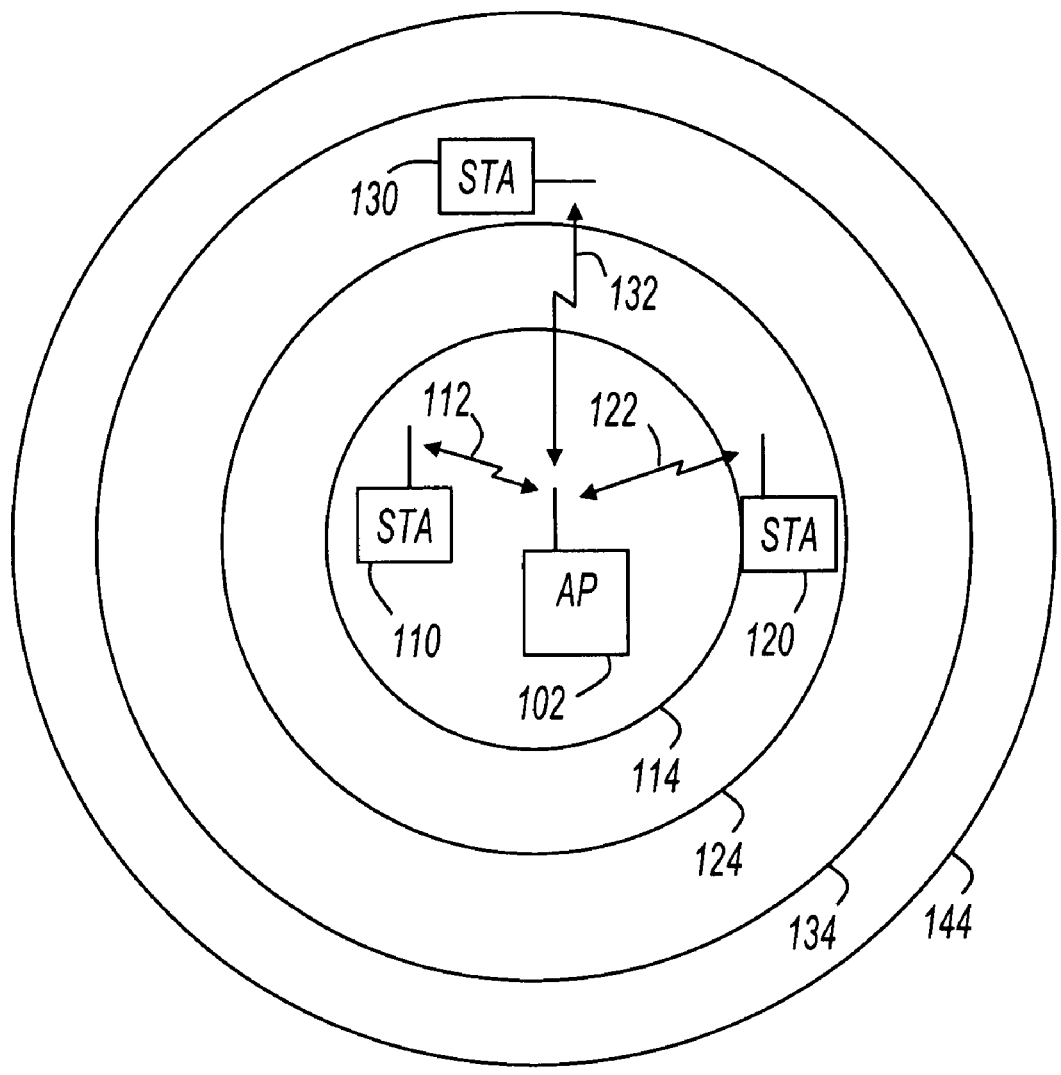
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless network. Wireless network 100 includes access point (AP) 102 and mobile stations (STA) 110, 120, and 130. In some embodiments, wireless network 100 is a wireless local area network (WLAN). For example, one or more of mobile stations 110, 120, and 130, or access point 102 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. Mobile stations 110, 120, and 130 may be any type of mobile station capable of communicating in network 100. For example, the mobile stations may be computers, personal digital assistants, wireless-capable cellular phones, home audio or video appliances, or the like.

Access point 102 communicates with mobile station (STA) 110 using signal 112. Access point 102 communicates with mobile station 120 using signal 122, and access point 102 communicates with mobile station 130 using signal 132. In some embodiments, signals 112, 122, and 132 are transmitted through a lossy medium. For example, the atmosphere surrounding AP 102, including any obstructions or reflectors can be considered a lossy medium. In general, signals 112, 122, and 132, lose some strength when propagating through the lossy medium on paths between access point 102 and the respective mobile stations. This loss in strength is referred to herein as "path loss." Each path between access point 102 and the various mobile stations may be different as a result of the path distance and differences in the lossy medium. For example, signal 132 may be subject to a greater path loss than signal 112, in part because the distance between access point 102 and mobile station 130 may be greater than the distance between access point 102 and mobile station 110. As shown in FIG. 1, signal 132 is subject to a larger path loss than signal 122, and signal 122 is subject to a larger path loss than signal 112. This is shown in FIG. 1 as being due to the relative distances between access point 102 and the various mobile stations, but it may also be due to other factors.

A mobile station within range of access point 102 may become "associated" with the access point for data communications. For example, mobile station 130 may be associated with access point 102. When a current association exists between mobile station 130 and access point 102, signal 132 allows data to be communicated between mobile station 130 and access point 102. A mobile station may also "disassociate" with an access point to end data communications between the mobile station and the access point. Disassociation may be a result of many different factors, including the mobile station associating with a different access point, or the mobile station leaving the wireless network.

In some embodiments, access point 102 can transmit signals having various power levels. For example, concentric circles 114, 124, 134, and 144 represent various transmit power levels transmitted by access point 102. Circle 144 represents the maximum output power that access point 102 can transmit, and circles 114, 124, and 134 represent access point output power levels that are less than the maximum.

The radius of each circle represents the amount of path loss that the respective output power level may overcome to provide reliable communications between access point 102 and a mobile station. For example, if access point 102 transmits with an output power corresponding to circle 114, then reliable communications may be established between access point 102 and mobile station 110, but not between access point 102 and the other mobile stations shown in FIG. 1. Also for example, if access point 102 transmits with an output power corresponding to circle 124, then reliable communications may be established between access point 102 and mobile station 110, and also between access point 102 and mobile station 120, but not between access point 102 and mobile station 130. Further, if access point 102 transmits with an output power corresponding to circle 134 or 144, then reliable communications may be established between access point 102 and all three mobile stations shown in FIG. 1.

In some embodiments, access point 102 may transmit using an output power only large enough to reliably communicate with mobile stations that are currently associated. For example, if only mobile station 110 is associated, then access point 102 may transmit at a power level corresponding to circle 114. Further, if both mobile stations 110 and 120 are associated, or if only mobile station 120 is associated, access point 102 may transmit at a power level corresponding to circle 124.

In some embodiments, access point 102 may dynamically adjust its transmitting power level when mobile stations associate or disassociate with the access point, or when path loss changes. For example, when a mobile station is successfully associated to access point 102, a receive signal strength (RSS)

from the mobile station is recorded by the access point. Based on RSS information recorded from all associated stations, the weakest communication link (often associated with the most remote mobile station) is identified. The most remote station may be used as a reference point to determine an adequate access point output power level to maintain reliable communications between the access point and all associated mobile stations.

In some embodiments, access point 102 broadcasts beacons at the maximum power level that corresponds to circle 144, regardless of the transmitting power level used to communicate with associated mobile stations. For example, in 802.11 compliant embodiments, beacon frames may always be transmitted at full power, while other frames may be transmitted at less than full power. By transmitting beacon frames at full power, mobile stations with a weaker communication link can be associated, even if the access point is using a lower power signal for frames other than beacon frames when communicating with mobile stations already associated.

In some embodiments of the present invention, more than one access point may be placed in proximity with each other. For example, in 802.11 compliant embodiments, each access point may communicate with one or more mobile stations to form a basic service set (BSS). Further, the access points may communicate with each other, forming an extended service set (ESS). By reducing the output power of one or more access points, the likelihood of interference between the access points may be reduced. For example, if two access points placed in close proximity to each other limit their output power to only that necessary to reliably communicate with currently associated mobile stations, then each of the access points may reduce potential interference between the two access points, and network capacity and reliability may increase.

Figure 2:
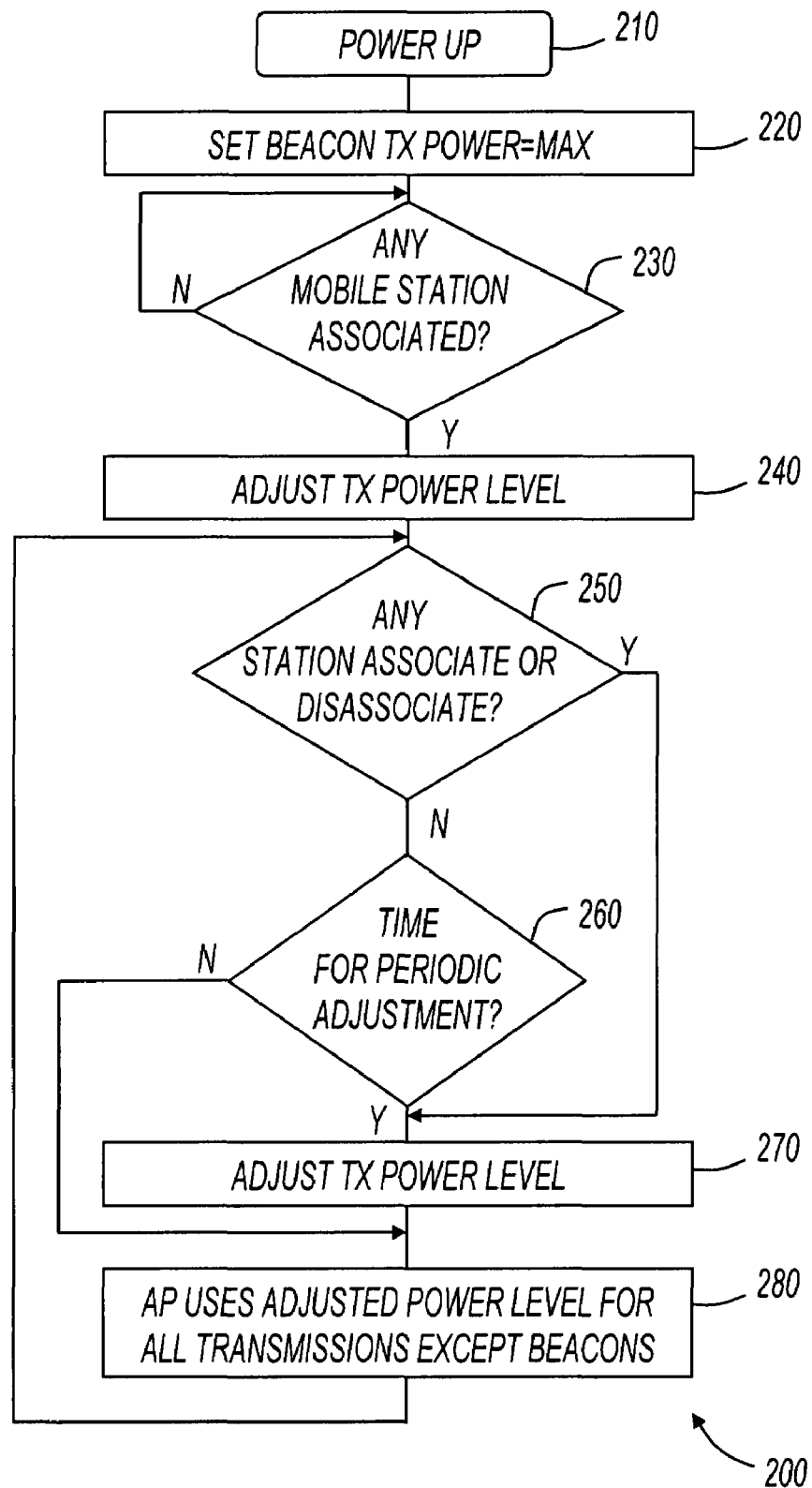
FIGS. 2 and 3 show flowcharts in accordance with various embodiments of the present invention.

FIG. 2 shows a flowchart in accordance with various embodiments of the present invention. In some embodiments, method 200 may be used to provide access point power control in a wireless network. In some embodiments, method 200, or portions thereof, is performed by an access point, a processor, or an electronic system, embodiments of which are shown in the various figures. Method 200 is not limited by the particular type of apparatus, software element, or system performing the method. The various actions in method 200 may be performed in the order presented, or may be performed in a different order. Further, in some embodiments, some actions listed in FIG. 2 are omitted from method 200.

Method 200 is shown beginning at block 210 in which an access point powers up. At this point in method 200, no mobile stations are associated with the access point referred to in 210. At 220, a beacon transmit power is set to a maximum value. The access point transmits beacons at maximum power to reach any mobile stations within range of the access point. In some embodiments, the access point may transmit beacon frames at maximum power level with a low duty cycle. For example, in 802.11 compliant embodiments, a beacon frame may be transmitted for approximately 0.35 milliseconds every 100 milliseconds, although this is not a limitation of the present invention.

If a mobile station within range of the access point wishes to associate, it may respond to a beacon frame by transmitting frames of its own. For example, referring back to FIG. 1, access point 102 may transmit beacon frames at a power level corresponding to circle 144. A mobile station such as mobile station 130 may respond by transmitting frames back to access point 102.

Referring now to FIG. 2, if no mobile station becomes associated, method 200 loops at block 230. If, however, a mobile station becomes associated, method 200 passes through block 230 to block 240. At 240, the transmit power level for all communications other than beacons is adjusted. For example, if mobile station 130 becomes associated with access point 102, access point 102 may adjust the transmit power level to correspond to circle 134. Various embodiments of actions corresponding to block 240 are described further below with reference to FIG. 3.

At 250 and 260, if any mobile station associates or disassociates, or if it is time to periodically adjust the transmit power level, then method 200 proceeds to block 270. Otherwise, block 270 is bypassed. In some embodiments, block 270 adjusts the transmit power level similar to block 240.

In some embodiments, a timer is set at 260 to set an interval for periodic adjustment of the transmit power level. For example, a hardware timer or a software timer may be set, and when the timer expires, method 200 may adjust the transmit power level at block 270. Various timer values may be used. For example, in an environment that experiences rapid changes in path loss for various mobile stations, a small timer value may be used to periodically adjust the transmit power level frequently. Also for example, in environments that do not experience rapid changes, large timer values may be used so that the output power level is adjusted less frequently.

At 280, the access point uses the adjusted power level for all transmissions except beacons. As long as the access point is powered up, a loop including blocks 250, 260, 270, and 280 is traversed to allow the output power level to be periodically adjusted based on changes in the network environment. Changes in the network environment include, but are not limited to, mobile stations associating and disassociating with the access point.

Figure 3:
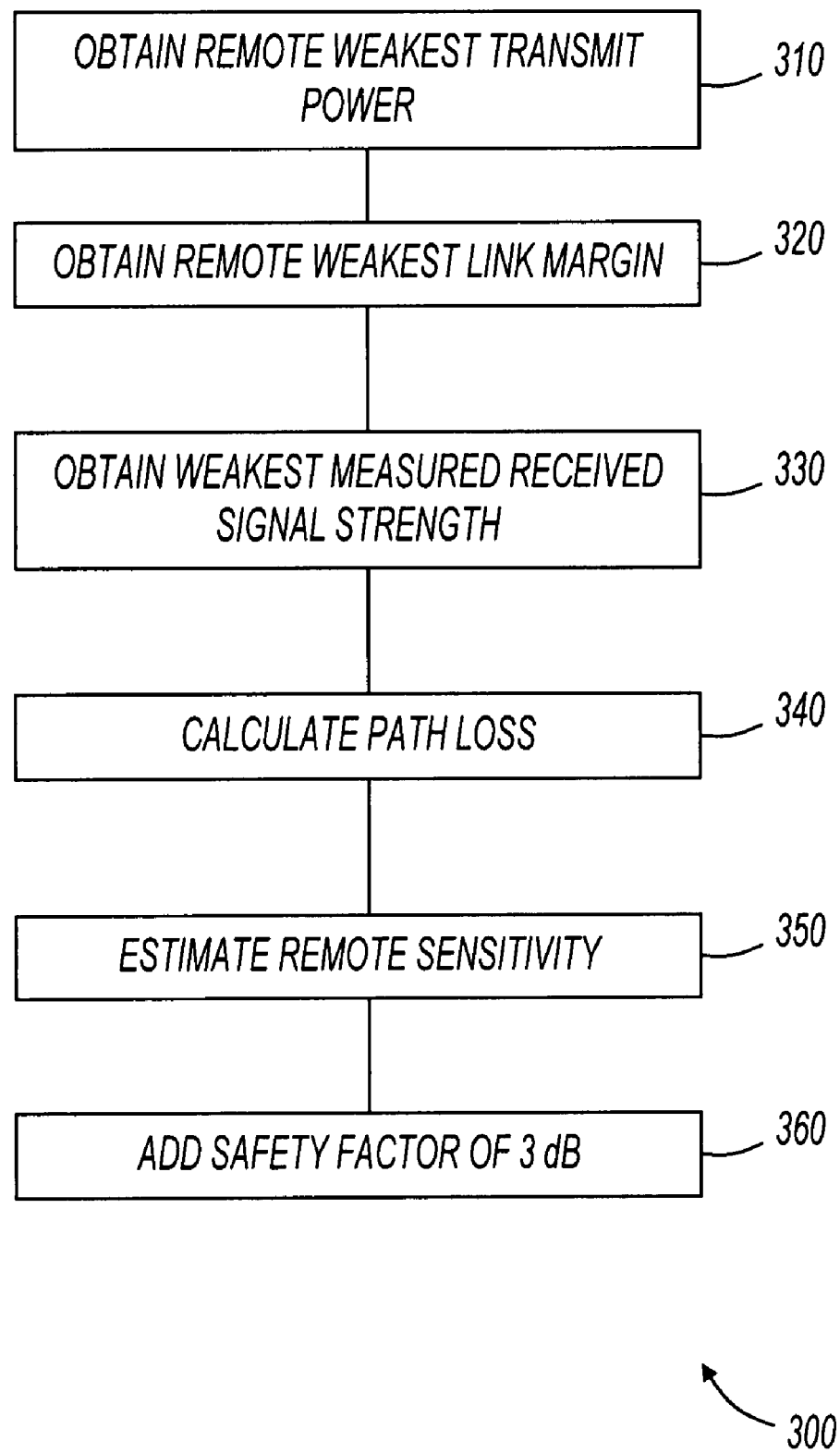

FIG. 3 shows a flowchart in accordance with various embodiments of the present invention. In some embodiments, method 300 may be used to determine an output power transmit level for an access point in a wireless network. In some embodiments, method 300, or portions thereof, is performed by an access point, a processor, or an electronic system, embodiments of which are shown in the various figures. Method 300 is not limited by the particular type of apparatus, software element, or system performing the method. The various actions in method 300 may be performed in the order presented, or may be performed in a different order. Further, in some embodiments, some actions listed in FIG. 3 are omitted from method 300.

Method 300 is shown beginning at block 310 in which a remote weakest transmit power is obtained. The "remote station" referred to in method 300 is the associated mobile station having the lowest received signal strength (RSS) as measured at the access point. In some embodiments, the actions of 310 correspond to receiving a value corresponding to the power transmitted by the "remote station," which is the station having the weakest RSS at the access point. At 320, a remote weakest link margin is obtained. In some embodiments, this corresponds to receiving a link margin value from the remote station.

At 330, the weakest measured received signal strength is obtained at the access point. In some embodiments, this corresponds to the received signal strength (RSS) from the remote station. At 340, a path loss is calculated as the difference between the remote Weakest transmit power and the weakest measured received signal strength.

At 350, a remote sensitivity is estimated as the current access point transmit power less the sum of the path loss and the remote weakest link margin. At 360, a safety factor of 3 dB is added to ensure reliable communications with the most remote mobile station. For example, an adjusted output power may be determined as the sum of the remote sensitivity, the path loss, and the safety factor of 3 dB.

A numerical example is now provided to illustrate method 300. The specific example presented is one of many possible calculations that can take place as a result of performing method 300, and is not meant to be limiting in any way. Assuming that the access point maximum transmit (P_apmax) power is 16 dBm, the remote weakest transmit power (P_remote) is obtained as 14 dBm, the remote weakest link margin (M_remote) is obtained as 6 dB, and the access point measured remote weakest signal strength (RSS_remote) is equal to −60 dBm, the path loss (Path_loss) can be calculated as:

$$\text{Path\_loss} = P\_remote - RSS\_remote; \text{ or}$$

$$\text{Path\_loss} = 14 - (-60) = 74 \text{ dB};$$

the remote sensitivity (Sen_remote) can be estimated as:

$$\text{Sen\_remote} = P\_apmax - \text{Loss\_path} - M\_remote; \text{ or}$$

$$\text{Sen\_remote} = 16 - 74 - 6 = -64 \text{ dBm};$$

and the adjusted access point transmit power (P_apnew) may be calculated as:

$$P\_apnew = \text{Sen\_remote} + \text{Path\_loss} + 3 \text{ dB}; \text{ or}$$

$$P\_apnew = -64 + 74 + 3 = 13 \text{ dBm}.$$

In the above example, the access point may reduce its output power by 3 dB to 13 dBm while stilling maintaining reliable communications with the mobile station that experiences the largest path loss.

Figure 4:
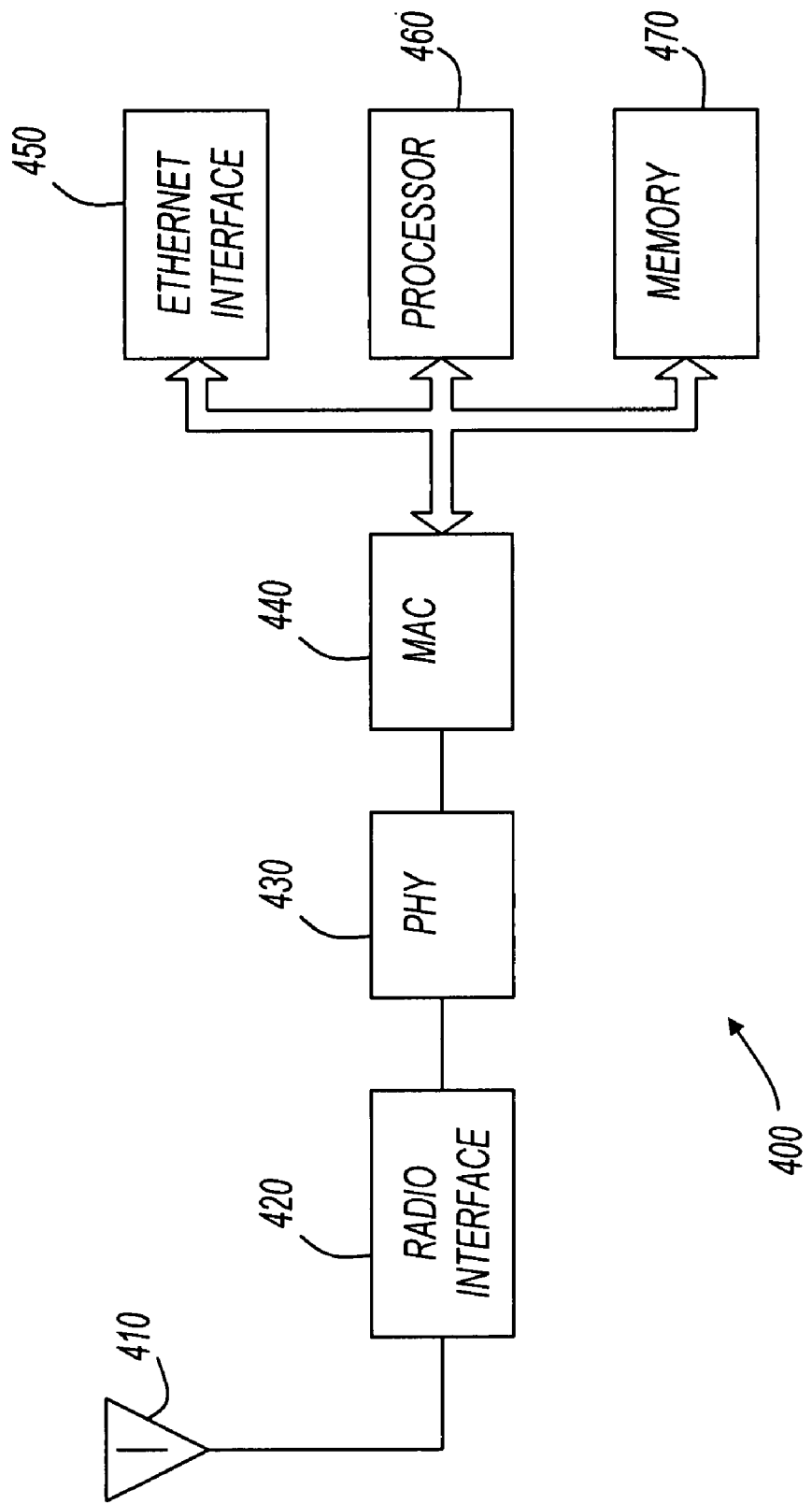
FIG. 4 shows a system diagram in accordance with various embodiments of the present invention.

FIG. 4 shows a system diagram in accordance with various embodiments of the present invention. Electronic system 400 includes antenna 410, radio interface 420, physical layer (PHY) 430, media access control (MAC) mechanism 440, Ethernet interface 450, processor 460, and memory 470. In some embodiments, electronic system 400 may be an access point capable of transmitting at various output power levels. In some embodiments, electronic system 400 may be an access point capable of transmitting beacons at a higher level than other types of transmissions. For example, electronic system 400 may be an 802.11 compliant access point capable of transmitting beacon frames at a maximum output power level, and all other types of frames at a reduced output power level. For example, electronic system 400 may be utilized in network 100 (FIG. 1) as access point 102.

In some embodiments, electronic system 400 may represent a system that includes an access point as well as other circuits. For example, in some embodiments, electronic system 400 may be a computer, such as a personal computer, a workstation, or the like, that includes a network interface as a peripheral or as an integrated unit. Further, electronic system 400 may include a series of access points that are coupled together in a network.

Antenna 410 may be a directional antenna or an omni-directional antenna. As used herein, the term omni-directional antenna refers to any antenna having a substantially uniform pattern in at least one plane. For example, in some embodiments, antenna 410 may be an omni-directional antenna such as a dipole antenna, or a quarter wave antenna. Also for example, in some embodiments, antenna 410 may be a directional antenna such as a parabolic dish antenna or a Yagi antenna. In still further embodiments, antenna 410 includes multiple physical antennas.

In operation, system 400 sends and receives signals using antenna 410, and the signals are processed by the various elements shown in FIG. 4. Radio interface 420 is coupled to antenna 410 to interact with a wireless network. Radio interface 420 may include circuitry to support the transmission and reception of radio frequency (RF) signals. For example, in some embodiments, radio interface 420 includes an RF receiver to receive signals and perform "front end" processing such as low noise amplification (LNA), filtering, frequency conversion or the like. Also for example, in some embodiments, radio interface 420 may include circuits to support frequency up-conversion, and an RF transmitter. In some embodiments, radio interface 420 is a variable output power radio interface that includes a transmitter having a variable output power. The output power may be controlled by any of the other blocks shown in FIG. 4, including processor 460, MAC mechanism 440, or PHY 430. The invention is not limited by the contents or function of radio interface 420.

Physical layer (PHY) 430 may be any suitable physical layer implementation. For example, PHY 430 may be a circuit block that implements a physical layer that complies with an IEEE 802.11 standard or other standard. Examples include, but are not limited to, direct sequence spread spectrum (DSSS), frequency hopping spread spectrum (FHSS), and orthogonal frequency division multiplexing (OFDM).

Media access control (MAC) mechanism 440 may be any suitable media access control layer implementation. For example, MAC 440 may be implemented in software, or hardware or any combination thereof. In some embodiments, a portion of MAC 440 may be implemented in hardware, and a portion may be implemented in software that is executed by processor 460. Further, MAC 440 may include a processor separate from processor 460. In some embodiments, MAC 440 may implement transmit power control by commanding RF interface 420 to increase output power whenever a beacon frame is sent or by commanding RF interface 420 to decrease output power whenever frames other than beacon frames are sent.

Processor 460 may perform method embodiments of the present invention, such as method 200 (FIG. 2) or method 300 (FIG. 3). Processor 460 represents any type of processor, including but not limited to, a microprocessor, a digital signal processor, a microcontroller, or the like.

Memory 470 represents an article that includes a machine readable medium. For example, memory 470 represents a random access memory (RAM), dynamic random access memory (DRAM), static random access memory (SRAM), read only memory (ROM), flash memory, or any other type of article that includes a medium readable by processor 460. Memory 470 may store instructions for performing the execution of the various method embodiments of the present invention.

Ethernet interface 450 may provide communications between electronic system 400 and other systems. For example, in some embodiments, electronic system 400 may be an access point that utilizes Ethernet interface 450 to communicate with a wired network or to communicate with other access points. Some embodiments of the present invention do not include Ethernet interface 450. For example, in some embodiments, electronic system 400 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   transmitting a beacon frame in a wireless network;
   receiving a signal from a mobile station;
   measuring a received signal strength of the signal received from the mobile station;
   receiving a remote transmit power value from the mobile station;
   determining a path loss as the difference between the remote transmit power and the received signal strength;
   determining an access point output power;
   determining a new access point output power value from the path loss; and
   setting the access point output power to the new access point output power value to reliably communicate with the mobile station, wherein setting the access point output power comprises reducing the output power of frames other than beacon frames.

2. The method of claim 1 wherein setting the access point output power further comprises transmitting beacon frames at a maximum power.

3. The method of claim 2 further comprising receiving a signal from a second mobile station.

4. The method of claim 3 further comprising calculating a second path loss to the second mobile station.

5. The method of claim 4 further comprising setting the output power to overcome a greater of the first path loss and the second path loss.

6. A method comprising:
   transmitting a beacon frame from an access point at a fall power level;
   receiving at the access point a signal from an associated station;
   estimating a sensitivity of the associated station;
   determining a new access point power level from the sensitivity of the associated station, wherein the new access point power level is less than the full power level; and
   transmitting frames other than beacon frames from the access point at the new access point power level.

7. The method of claim 6 wherein transmitting frames other than beacon frames comprises transmitting at a power level high enough to overcome a path loss to an associated mobile station.

8. The method of claim 7 further comprising adjusting the power level when the associated mobile station disassociates.

9. The method of claim 7 further comprising adjusting the power level when another mobile station associates.

10. The method of claim 6 further comprising periodically readjusting the power level.

11. The method of claim 10 wherein periodically adjusting the power level comprises determining a sensitivity an associated mobile station.

12. An apparatus including a medium to hold machine-accessible instructions that when accessed result in a machine performing:
    transmitting a beacon frame from an access point at a full power level;
    receiving at the access point a signal from an associated station;
    estimating a sensitivity of the associated station;
    determining a new access point power level from the sensitivity of the associated station, wherein the new access point power level is less than the full power level; and
    transmitting frames other than beacon frames from the access point at the new access point power level.

13. The apparatus of claim 12 wherein transmitting frames other than beacon frames comprises transmitting at a power level high enough to overcome a path loss to an associated mobile station.

14. The apparatus of claim 13 wherein machine-accessible instructions, when accessed, result in the machine further performing adjusting the power level when the associated mobile station disassociates.

15. The apparatus of claim 13 wherein machine-accessible instructions, when accessed, result in the machine further performing adjusting the power level when another mobile station associates.

16. An electronic system comprising:
    an antenna;
    a variable output power radio interface coupled to the antenna;
    a processing apparatus coupled to the variable output power radio interface to receive link margin values from associated stations, to determine a reduced output power from the link margin values, and to adjust an output power to the reduced output power to reduce potential interference while communicating with associated mobile stations, by reducing the output power of frames other than beacon frames; and an Ethernet interface coupled to the processing apparatus.

17. The electronic system of claim 16 wherein transmitting frames other than beacon frames comprises transmitting at a power level high enough to overcome a path loss to an associated mobile station.

* * * * *

UNITED STATES PATENT AND TRADEMARK OFFICE
CERTIFICATE OF CORRECTION

PATENT NO. : 7,415,262 B2  Page 1 of 1
APPLICATION NO. : 10/812199
DATED : August 19, 2008
INVENTOR(S) : Liu et al.

It is certified that error appears in the above-identified patent and that said Letters Patent is hereby corrected as shown below:

In column 7, line 31, in Claim 6, delete "fall" and insert -- full --, therefor.

In column 7, line 36, in Claim 6, delete "determing" and insert -- determining --, therefor.

In column 8, line 14, in Claim 12, delete "determing" and insert -- determining --, therefor.

Signed and Sealed this

Eighteenth Day of November, 2008

JON W. DUDAS
*Director of the United States Patent and Trademark Office*